June 1, 1965   J. W. WEIDENMAN   3,187,287
POTENTIMETER WITH VERNIER ADJUSTMENT MEANS
Filed July 31, 1964   2 Sheets-Sheet 1

INVENTOR.
JAMES W. WEIDENMAN
BY
ATTORNEY

June 1, 1965  J. W. WEIDENMAN  3,187,287
POTENTIMETER WITH VERNIER ADJUSTMENT MEANS
Filed July 31, 1964  2 Sheets-Sheet 2
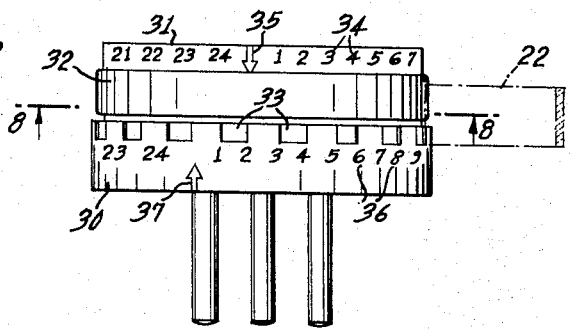
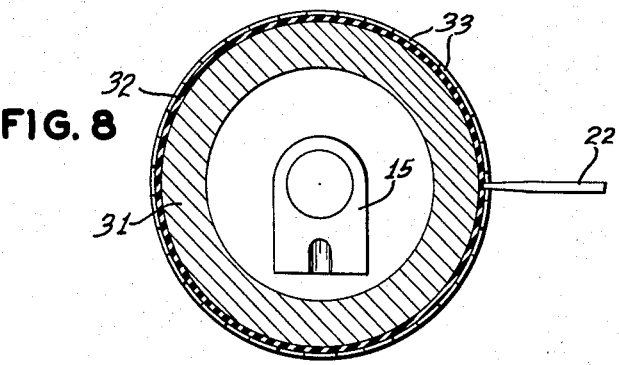
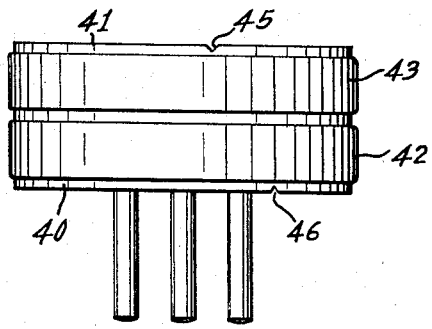
INVENTOR.
James W. Weidenman
BY
ATTORNEY United States Patent Office 3,187,287
Patented June 1, 1965

3,187,287
POTENTIOMETER WITH VERNIER
ADJUSTMENT MEANS
James W. Weidenman, Westbury, N.Y., assignor to Litton Industries, Inc., Beverly Hills, Calif.
Filed July 31, 1964, Ser. No. 387,553
3 Claims. (Cl. 338—163)

This application is a continuation-in-part of application, Ser. No. 177,352, filed March 5, 1962 (now abandoned).

This invention relates to adjustable units such as potentiometers, and more particularly to means for facilitating manual vernier adjustment of a potentiometer, rheostat or similar device.

It is an object of the invention to provide an improved and simplified means for enabling precise adjustment of an instrument such as a potentiometer designed for rotary manual adjustment.

Another object of the invention is to provide an improved vernier control means for a potentiometer which may be precisely operated by a spatulate tool from various points in axial and radial directions. This is often advantageous where the potentiometer is fastened in a more or less inaccessible position in a chassis assembly containing various components crowded into a compact mounting structure.

Still another object of the invention is to provide an improved vernier adjustment means for small trimming potentiometers, which are usually only a fraction of an inch in diameter. It is obviously difficult to adjust a potentiometer of this size with the desired precision by grasping the small control knob with the fingers.

According to the present invention as embodied in a potentiometer, the base and pivoted knob or cover assembly of the potentiometer have closely spaced circumferential edges, the cover assembly or a part thereof being attached to the contact member or slider to effect the required adjustment of the resistance value. The substantially circular contiguous edge portions of the base and of the knob or rotatable portion of the cover assembly are formed with soft rubber-like surfaces, or notched or serrated so that they are adapted to receive the spatulate tip of a tool blade, such as a screw driver, and provide vernier adjustment of the contact member when the blade of the tool is twisted. The notches or blade-engaging area may extend entirely around the circumference of the potentiometer and thus permit of vernier adjustment with the tool engaging various points around the periphery of the potentiometer. The vernier adjustment therefore can be readily accomplished even through the cover or knob of the potentiometer is obstructed to a considerable extent by other components of a chassis assembly.

In accordance with another feature of the invention, in the modification employing circumferential teeth, the shape and spacing of the teeth on the base member and cover are such as to permit the tip of the screw driver or tool to be twisted through a complete turn, thereby permitting a relatively large adjustment of the contact member wihout removing the tool from its operating position. This renders it unnecessary to withdraw and reinsert the tool either for slight or large angular adjustment.

These and other objects and advantages of the invention will appear from the following detailed description of the embodiments thereof shown in the accompanying drawings, wherein—

FIG. 7 is a view similar to FIG. 2 of another modification;

FIG. 8 is a sectional view taken on the line 8—8 of FIG. 7; and

FIG. 9 is a side view of another modification.

Figure 1:
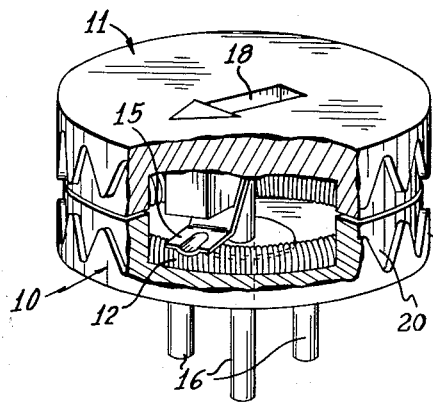
FIG. 1 is a view in perspective of a trimmer potentiometer according to the invention, with the casing or cover broken away to reveal the adjustable contact member and the resistance element.
Figure 2:
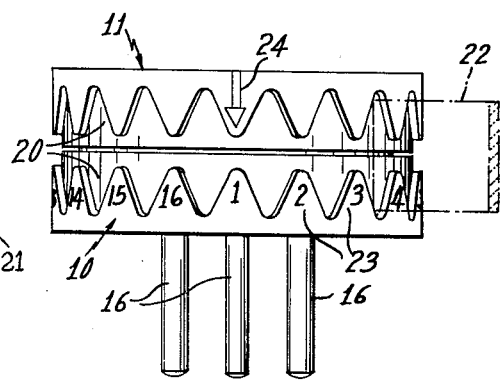
FIG. 2 is a side elevational view of the potentiometer shown in FIG. 1.

Referring to the drawings, FIGS. 1 and 2 show a potentiometer comprising a circular base member 10 on which is pivoted a cover or cap member 11 forming an adjusting knob having substantially the same diameter as that of the base member 10. By way of example, a resistance element 12 in the form of a helical coil is mounted on the base 10 in position where it is engaged by an adjustable contact member 15 which is attached to the cap or cover member 11. The ends of the resistor 12 and the contact member 15 are connected to terminals, such as the pins 16 projecting from the bottom of the base 10. Thus the setting of the potentiometer is changed by turning the knob or cap 11, and a slot 18 may be provided on the outside of said cap for adjusting the potentiometer by means of a screw driver.

Figure 3:
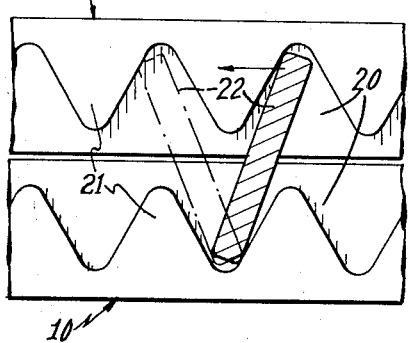
FIGS. 3 and 4 are fragmentary views to an enlarged scale of the serrated portions of the base and cap members, showing how the potentiometer of FIG. 1 may be adjusted either by partial or continuous twisting of a screw driver or similar spatulate tool.
Figure 4:
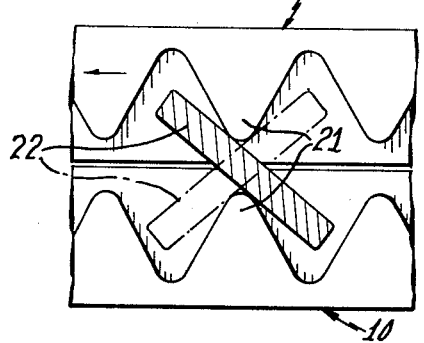

In accordance with the invention, the adjacent edges of the base member 10 and cap 11 are provided with a series of recesses or notches 20 around the periphery thereof, thus forming a number of spaced serrations or teeth 21. As shown, the teeth 21 are tapered so that a screw driver or similar tool 22 may be inserted in the recesses 20 in any angular position of the cap on the base member 10 (see FIGS. 2 and 3). While the number of notches or teeth in the members 10 and 11 are equal in the construction shown, obviously the number of notches in one member may be greater than those in the other member. When the spatulate tool 22 is twisted from the position shown in full lines to the position shown in dotted lines in FIG. 3, the knob or cap 11 will be turned in the direction of the arrow, thus effecting a precise vernier adjustment of the contact member 15. Preferably as shown the size, shape and spacing of the teeth 21 are such as to permit a complete rotation of the tool 22 without removing it from its operative position in the notches 20. This is illustrated in FIG. 4 where the end of the tool 22 is shown in full lines in the position which it assumes when the tool is twisted beyond the position shown in FIG. 3. It will be evident therefore that either a small vernier adjustment or a relatively large adjustment can be made without removing and reinserting the tip end of the tool 22 in the notches 20.

It will also be noted that vernier adjustment can be readily accomplished from any position around the circumference of the potentiometer, if the serrated portions of the base member and cap extend completely around the circumference of the unit. If desired, the raised teeth 21 on one member, for example the base 10, may be marked with numerals 23 and the other member with a pointer or narrow 24 to indicate the adjusted position of the cap on the base. The serrated portions of the base member 10 and cap 11 may be formed by molding where these members are made of a suitable plastic or similar insulating compound, or may be cut or formed in any desired manner. The raised teeth 21 alternatively may be made of soft rubber or rubber-like material to provide a surface adapted for the same blade-and-socket engagement between the tip of the tool 22 and the base or cap. Such a soft rubber element may comprise a band or strip mounted on or attached to the base member or cap.

Figure 6:
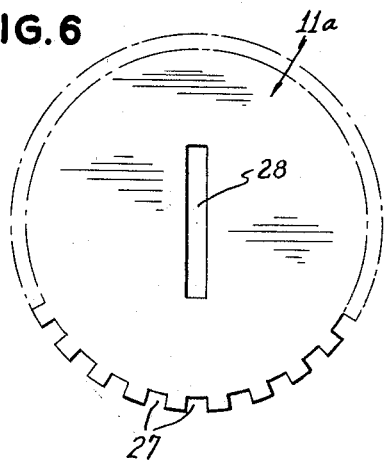
FIGS. 5 and 6 are side and top elevational views of a modification also having serrated edges.
Figure 5:
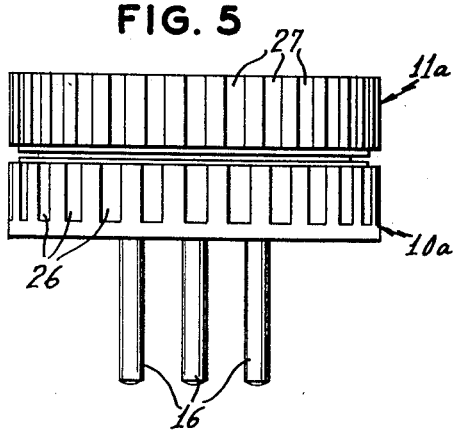

The form or shape of the teeth in the cap and base member may be altered without departing from the scope of the invention. Thus as shown in FIGS. 5 and 6, the base member 10a and cap member or knob 11a may be provided with straight slots 26 and 27, respectively, forming substantially rectangular teeth of uniform cross-section. The sizes and members of the teeth in the base and cap may be identical or, as shown in the drawing, may be different. The cap member or knob 11a may also be provided with a screw driver slot 28, if desired, to facilitate adjustment from the front of the unit. The teeth around the periphery of the base member 10a or cap 11a may be integral therewith or may be formed in a soft rubber or plastic ring attached to said base member or cap.

FIGS. 7 and 8 illustrate a further modification of the invention in which the serrated edge of the cap member is replaced by a soft rubber band or surfacing, as mentioned above. The trimmer potentiometer, shown to an enlarged scale, comprises a base member 30 on which is pivoted a cap member or knob 31 to which is attached the movable contact member 15 as in the construction shown in FIGS. 1 and 2. A soft rubber band or strip 32 is frictionally held or secured in any desired manner on the cap member 31, in position to be engaged by the screw driver 22. When the tool 22 is inserted in one of the notches 33 in the base member 30 and twisted, it will effect a vernier adjustment of the cap 31 and contact member 15, permitting a precise adjustment of the potentiometer from any point around the circumference of the unit. As shown more clearly in FIG. 8, the tip of the tool 22 forms an indentation in the band 32 of rubber or rubber-like material, insuring an effective blade-and-socket engagement as in the modifications shown in FIGS. 1–6, so that twisting the tool will turn the cap or knob 31. The cap 31 may be provided with markings 34, 35 cooperating with the markings 36, 37 on the base member 30 to indicate the potentiometer adjustment.

Instead of providing a serrated edge on either the base member 30 or cap 31, both the base and cap may be provided with a soft rubber surfacing. This embodiment of the invention is shown in FIG. 9, which shows the base 40 and cap 41 carrying rubber bands or strips 42 and 43, respectively, on the contiguous external surfaces thereof. Notches 45 and 46 on the cap and base members serve to indicate the setting of the potentiometer as it is adjusted by a screw driver as described.

While several modifications of the invention have been shown and described for the purpose of explaining the underlying principles thereof, it is to be understood that various other modifications will occur to those skilled in the art and are intended to come within the scope of the invention, such as changes in the size or shape of the teeth or frictional surfacing of the cap and base member and the use of other suitable surfacing materials. It is to be understood further that the term "potentiometer" in the specification and claims is intended to include a variable resistor, rheostat, rotatable tuning slug or other equivalent device requiring manual vernier adjustment in service.

What is claimed is:

1. An adjustable device requiring vernier angular adjustment, comprising
   a base member, and
   a cap member or knob pivoted on said base member,
   said base and cap members being of circular cross-section perpendicular to the pivotal axis,
   said members being provided with substantially co-axial soft rubber bands, one on each member extending around the circumference thereof for frictional engagement with a spatulate vernier-adjusting tool.

2. A potentiometer comprising
   a circular base member,
   a resistance element mounted on said base member,
   a rotatable cap member pivoted on said base member, said cap member being of circular cross-section perpendicular to its pivotal axis, and
   an adjustable contact member attached to said cap member and engaging said resistance element,
   the adjacent circumferential outside edge portions of said cap member and circular base member being provided with opposed serrations adapted to receive the tip of a manual spatulate tool for vernier adjustment of said contact member when the tool is twisted while the tip engages the serrations in the cap member and base member, the serrations being shaped and spaced apart to permit complete rotation of the tip of said tool while it is held in engagement with the cap and base members.

3. An adjustable device requiring vernier angular adjustment, comprising
   a base member, and
   a cap member or knob pivoted on said base member, said base and cap members being of circular cross-section perpendicular to the pivotal axis, said members being provided with substantially co-axial bands, one on each member, extending around the circumference thereof for frictional engagement with a spatulate vernier-adjusting tool, one of said bands being soft and the other cylindrically serrated.

References Cited by the Examiner

UNITED STATES PATENTS

| 1,519,621 | 12/24 | Kent | 338—163 |
| 1,542,568 | 6/25 | Miller | 74—10.54 X |
| 1,587,389 | 6/26 | Lissen | 74—10.54 X |
| 2,477,746 | 8/49 | Huddleston | 338—163 |

FOREIGN PATENTS

| 960,409 | 3/57 | Germany. |

RICHARD M. WOOD, *Primary Examiner*.